(No Model.)
6 Sheets—Sheet 3.
G. S. DWIGHT, Dec'd.
M. T. DWIGHT, Administratrix.
APPARATUS FOR THE MANUFACTURE OF FUEL GAS.
No. 406,637.
Patented July 9, 1889.
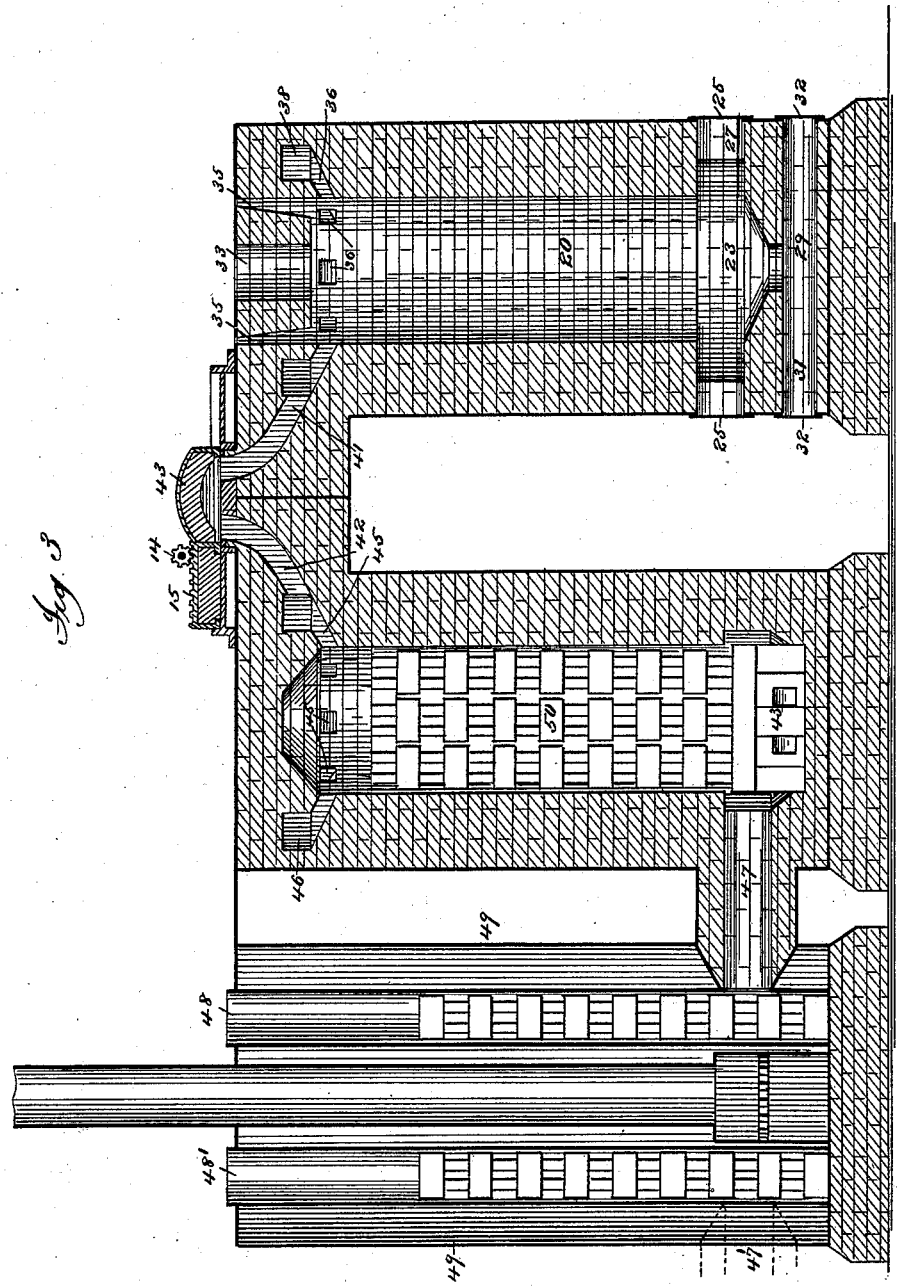

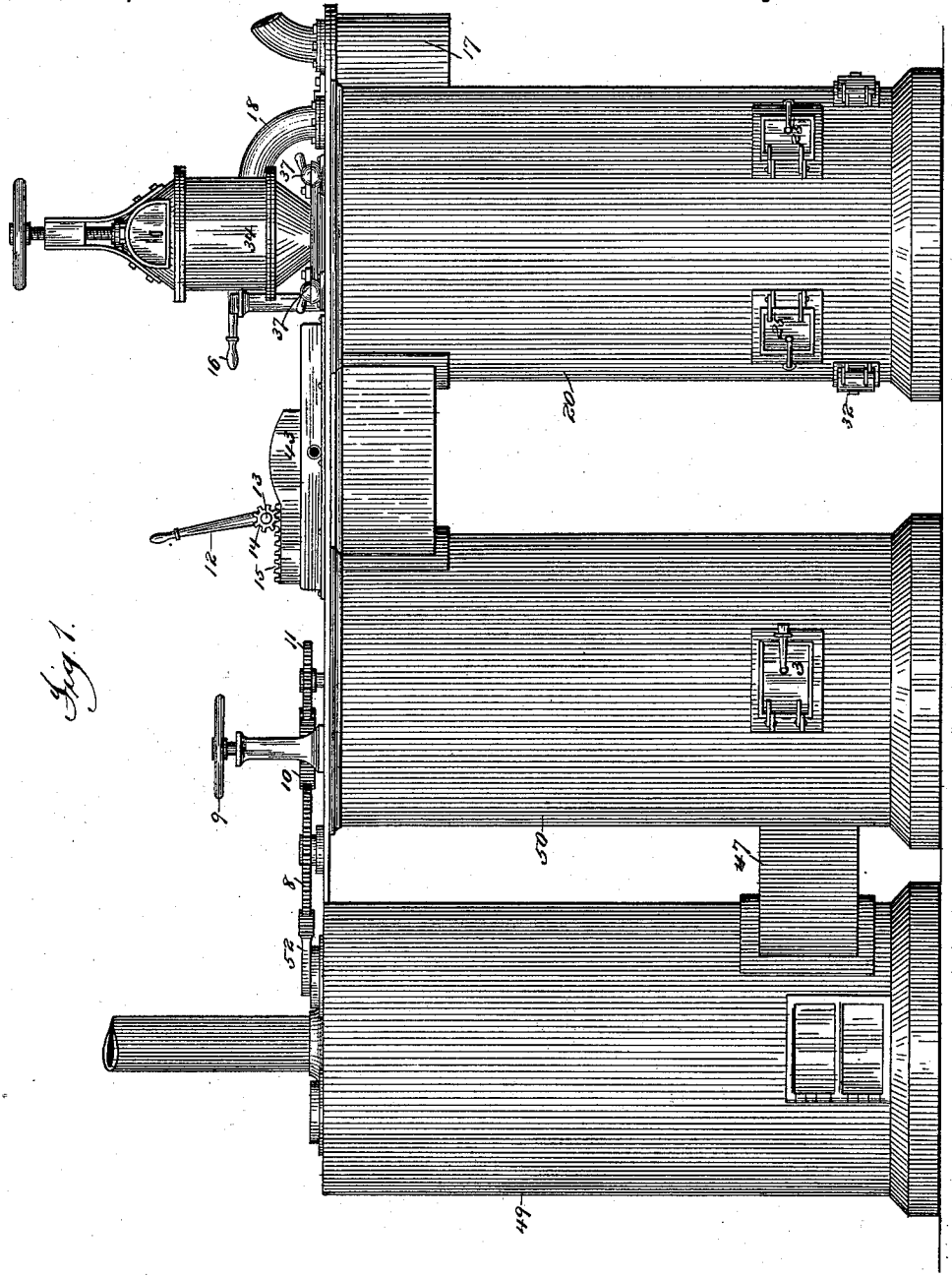

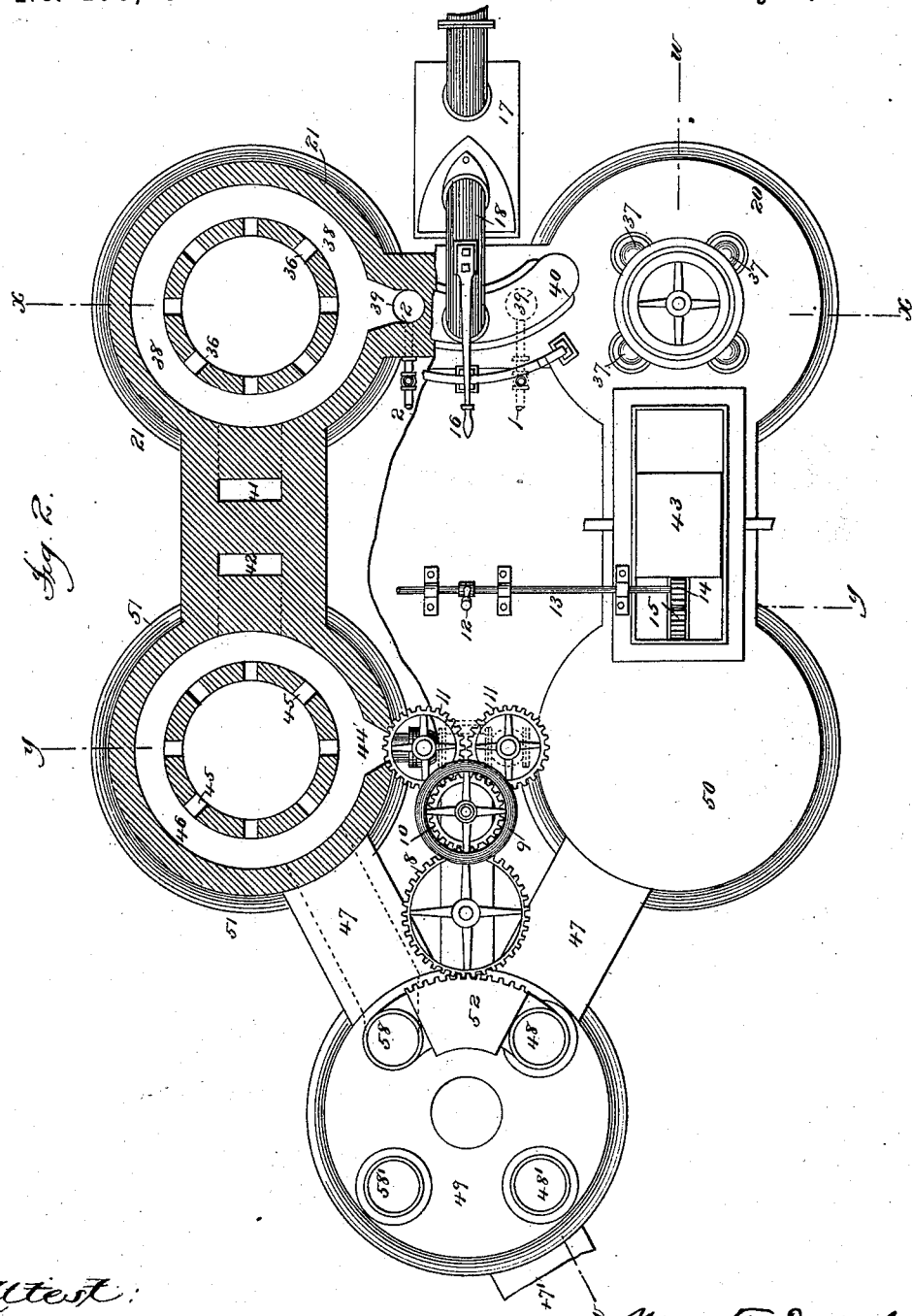

(No Model.) 6 Sheets—Sheet 4.
G. S. DWIGHT, Dec'd.
M. T. Dwight, Administratrix.
APPARATUS FOR THE MANUFACTURE OF FUEL GAS.
No. 406,637. Patented July 9, 1889.
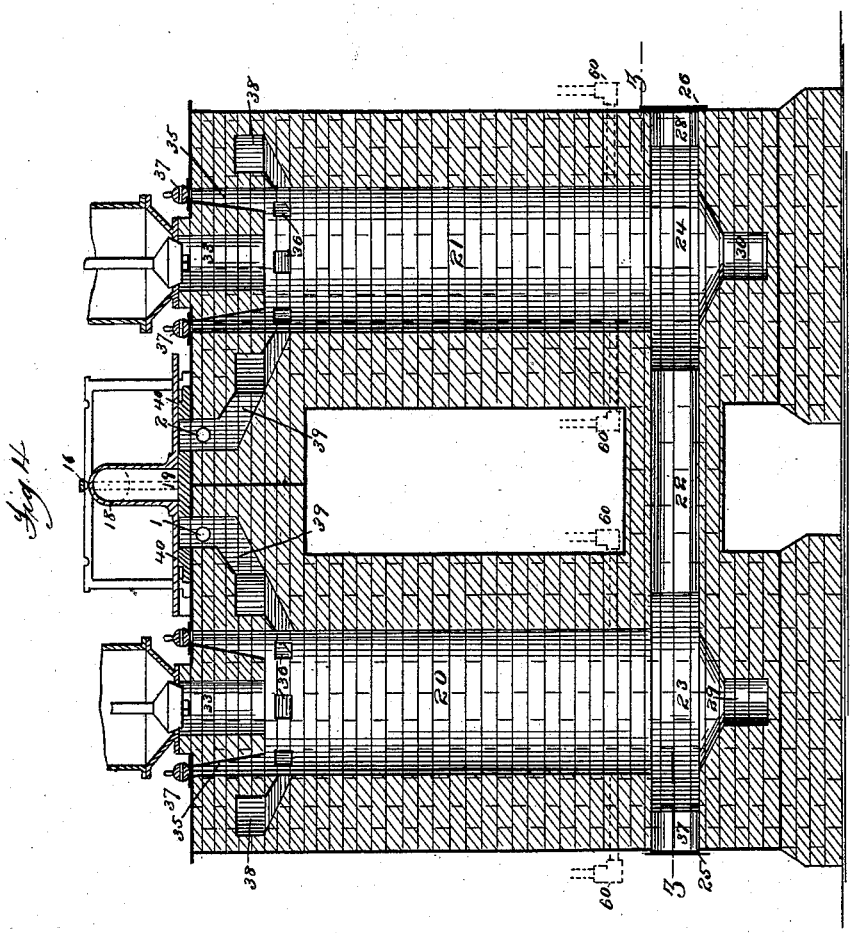

(No Model.) 6 Sheets—Sheet 5.
G. S. DWIGHT, Dec'd.
M. T. Dwight, Administratrix.
APPARATUS FOR THE MANUFACTURE OF FUEL GAS.
No. 406,637. Patented July 9, 1889.
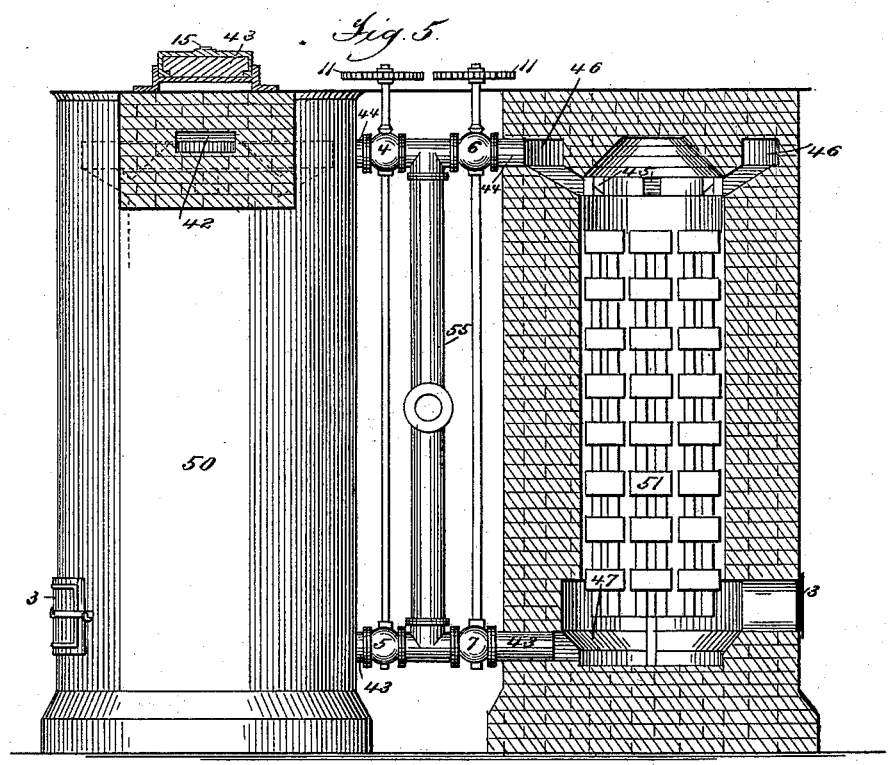
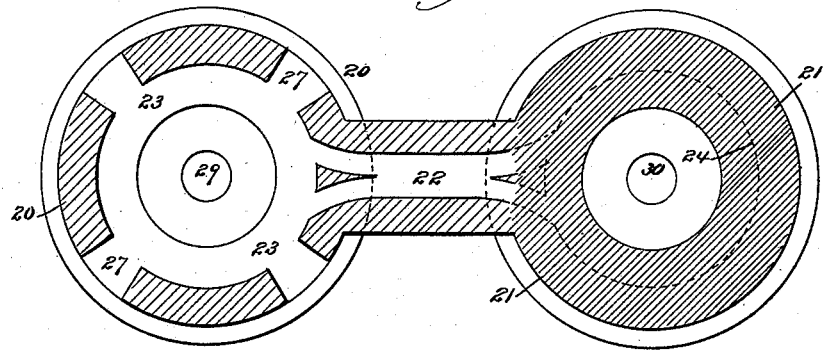

(No Model.) 6 Sheets—Sheet 6.
G. S. DWIGHT, Dec'd.
M. T. Dwight, Administratrix.
APPARATUS FOR THE MANUFACTURE OF FUEL GAS.
No. 406,637. Patented July 9, 1889.
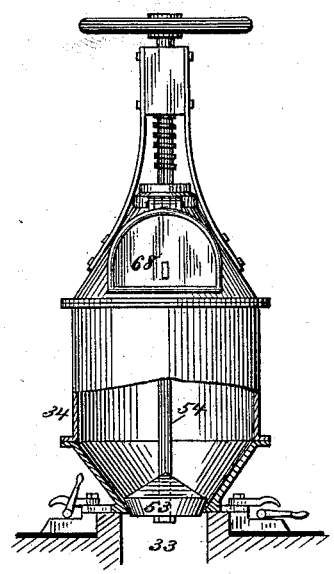
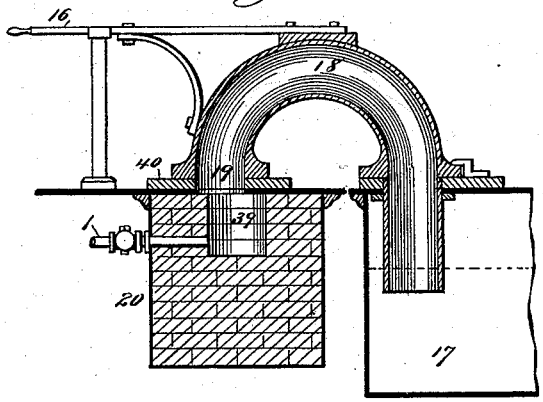
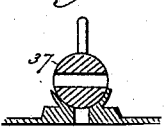

UNITED STATES PATENT OFFICE.

MARY T. DWIGHT, OF MONTCLAIR, NEW JERSEY, ADMINISTRATRIX OF GEORGE S. DWIGHT, DECEASED.

APPARATUS FOR THE MANUFACTURE OF FUEL-GAS.

SPECIFICATION forming part of Letters Patent No. 406,637, dated July 9, 1889.

Original application filed October 2, 1884, Serial No. 144,535. Divided and this application filed January 14, 1888. Serial No. 260,714. (No model.)

*To all whom it may concern:*

Be it known that GEORGE S. DWIGHT, late a citizen of the United States, residing at Montclair, county of Essex, and State of New Jersey, deceased, did invent certain new and useful Improvements in Apparatus for the Manufacture of Fuel-Gas, fully described and represented in the following specification and the accompanying drawings, forming a part of the same.

The present invention relates to certain improvements in that class of gas-furnaces in which steam is brought into contact with glowing carbon, thereby becoming decomposed and forming carbonic acid and free hydrogen, after which the carbonic acid thus produced is converted into carbonic oxide by the absorption of a further element of carbon, thus making what is commonly known as "water-gas."

The furnace which forms the subject-matter of the present application is especially designed and adapted for carrying into practical operation the process described and claimed in the application for United States Letters Patent filed by the late George S. Dwight on October 2, 1884, Serial No. 144,535, now Patent No. 387,676, of which this is a division. Any extended explanation of the process to be carried out by the furnace is therefore unnecessary herein, as said process forms no part of the present invention.

In the accompanying drawings, Figure 1 is a side elevation of a furnace embodying the present invention. Fig. 2 is a plan view thereof, a portion being cut away to better show the interior construction of two of the chambers. Fig. 3 is a sectional elevation taken on the lines W W of Fig. 2. Fig. 4 is a sectional elevation taken on the lines *x x* of Fig. 2, showing the interior of the fuel-chambers. Fig. 5 is a sectional elevation taken on the line *y y* of Fig. 2, showing one of the chambers in elevation. Fig. 6 is a horizontal section taken on the lines *z z* of Fig. 4, showing particularly the base of the fuel-chambers. Fig. 7 is a detail view, enlarged, of the fuel-feeding hopper, a portion of the same being broken away to show its interior. Fig. 8 is a vertical sectional view of the curved pipe for conveying the gas to the hydraulic tank; and Figs. 9 and 10 are sectional views of one of the stoking-hole covers or lids, showing it in an open and closed position, respectively.

As shown in the drawings, 20 21 are two fuel-chambers for the combustion of fuel, which are built in the usual manner of firebrick incased in iron plate, and are connected together at their lower ends by a passage 22, that leads from circular recesses or air-spaces 23 24, which surround the interior of the chambers at their bases. Access is had to these air-spaces for stoking and other purposes through doors 25 26, opening into short passages 27 28, respectively. Both chambers have ash-pits 29 30, which are accessible through passages 31, that are closed by doors 32, as is clearly shown in Figs. 3 and 4. The short passages 27 28 are placed with reference to convenient entrance, it being obvious that they may be arranged in different positions. Two of such positions are shown—one in Figs. 3 and 4 and the other in Figs. 1 and 6, the latter arrangement being preferred. Each chamber has an opening 33 at its top for the admission of fuel from a fuel-charger 34 and a series of vertical stoking-holes 35, each of which is closed by a ball-like cover 37, resting in a closely-fitting cup and provided with a passage corresponding to said holes 35, which may be turned so as to permit the entrance of the stoking-bar, as is clearly shown in Figs. 4, 9, and 10.

The fuel-charger 34 consists of a chamber or hopper secured above the opening 33 in the manner indicated in Fig. 7, said hopper being provided with a door, as 68, for the admission of fuel, and at its bottom with a valve 53, which is connected with and operated by a screw-rod 54, so that by raising or lowering said valve the supply of fuel admitted to the fuel-chamber can be regulated. These chambers are also provided at their tops with a series of short upwardly-inclined passages or tuyeres 36 for the entrance of air and the escape of gas, which connect with a circular recess 38 within the walls of the chambers, from which leads a passage 39, opening out of the top of the chambers and there controlled by a sliding cover 40. This sliding cover is provided with an opening 19, from which leads a pipe 18, connecting with a hydraulic tank 17, that is suitably arranged between the two fuel-chambers. The said cover is rendered capable of sliding over the two openings 39 of the fuel-chambers, swinging upon a center formed by the connection between its curved pipe and the hydraulic tank 7, which movement is imparted to it through its hand-lever 16, as is clearly seen in Figs. 2 and 8.

Leading from the recesses 38 in the fuel-chambers are also passages 41, that connect with similar passages 42, leading from recesses 46 in the top of the air-heating chambers 50 51. The passages 41 42 are controlled by sliding covers 43, that are mounted on ways and are so arranged that by being moved to and fro they close or connect the mouths of the passages, as shown in Fig. 3. These sliding covers 43 are provided with racks 15, that are engaged by geared wheels 14 upon each end of a rod 13, held in suitable bearings on the top or cover of the chambers, whereby they may be moved simultaneously through the hand-lever 12. The ways supporting these sliding covers are provided with water-pipes, through which water is conveyed to keep them cool and prevent their warping and thereby coming out of order, as is common and well known. The air-heating chambers 50 51 are similar in construction to the fuel-chambers, being formed of fire-brick incased in iron plate in the usual manner, and are filled with fire-brick or other refractory material in the ordinary way, and are provided at their bases with air-blast entrances 43, and at or near their upper ends with similar entrances 44. The entrances 43 each lead into a circular space around the refractory material at the base of the chambers, while the entrances 44 lead into the circular recess 46 within the walls of the chambers at their upper ends, from which recesses lead a series of short inclined passages or tuyeres 45, opening into the chambers 50 51. Access may be had to the interior of the chambers 50 51 through the doors 3, as shown in Figs. 1 and 5. These chambers, as here shown, are of the same size as the fuel-chambers; but in practice they will be made much larger than the former.

The blast-entrances 43 44 are connected through suitable T's with a supply-pipe 55, which leads from any suitable air-blast apparatus, said entrances being controlled by valves 4 5 6 7 to permit and shut off the ingress of air into the chambers, each pair of valves communicating with the same chamber, having their stems connected together, so as to be operated at the same time and in the same direction, the ports in these valves being so arranged that when the valves 4 7 are open the valves 6 5 will be closed, and vice versa. The upper ends of the valve-stems are provided with gear-wheels 11, that mesh with another gear-wheel 10, that receives motion from a hand-wheel 9, by which the respective valves are all simultaneously manipulated. The air-heating chambers 50 51 are also provided with short passages 47, that lead from the circular spaces at their bases to flues or tubes 48 58, arranged within a boiler 49. It is to be understood that these passages 47 may lead directly to a chimney, allowing the products of combustion to escape directly into the air; but as they carry a considerable amount of heat, which can be utilized in the making of steam, the products are preferably conveyed to a boiler arranged for that purpose. This boiler 49, as illustrated in the drawings, is provided with means for utilizing the heat of these waste products of combustion, which after passing upward through the refractory material which fills the tubes and absorbs the heat contained thereby escape into the open air. It is obvious that if a continuous process of gas-making is desired the duplicate chambers necessary to such continuous operation may be also connected to the boiler in the same manner, so as to allow the waste products of combustion to escape by a similar passage 47' (shown in dotted lines in Fig. 3) and through tubes 48' 58' into the open air. These boiler-tubes 48 58 are provided at their upper ends with a sliding valve 52, which is operated so as to open or close them at the proper time by an intermediate gear-wheel 8, which meshes with a rack on said sliding valve, and with the gear-wheel 10, movement being imparted to the valve through the hand-wheel 9, whereby said valve 52 and the valves controlling the blast-entrances 43 44 are operated and controlled at the same time, as is clearly seen in Figs. 1, 2, and 5, for the purpose to be hereinafter explained.

The method of operating this improved compound furnace in the process of making gas will now be described.

If there are grate-bars above the ash-pits—a matter somewhat decided by the nature of the fuel employed—a fire is kindled thereon, or, if bars are not used, then in the ash-pit 29 of the fuel-chamber 20, its doors 32 being left open to give air. All other openings except passages 41 42 and tubes 48 are closed, and thus draft is established from the ash-pit, and the products of combustion pass upward through chamber 20 and tuyere 36 and recess 38 through passages 41 and 42, the sliding valve 43 being moved so as to form a communicating opening between said passages, and from thence downward from recess 46 and tuyere 45 through the refractory material in the air-heating chamber 50, which will become heated thereby, and by passage 47 into boiler-tube 48, and up through the refractory material therein, escaping into the open air. When the fuel in the chamber 20 has been sufficiently ignited to bear the blast, the doors 32 will be closed and the valve 52 will be moved so as to cover the tube 48. In shifting the valve 52 to cover the tube 48 the air-valves 5 6 will be opened, the valves 4 7 remaining closed. The air driven by the blast apparatus will pass through the pipe 55 and enter the base of the heating-chamber 50 through the valve 5 and passage 43 and the top of heating-chamber 51 through the valve 6 and passage 44. The air entering in the base of heating-chamber 50 will pass upward through the refractory material therein and become heated thereby, and thence pass through tuyeres 45, recess 46, and passages 42 41 into the combustion-chamber 20 through recess 38 and tuyeres 36, where the now-heated blast creates an active combustion at the top of the fuel contained therein. The products of partial combustion, aided to a certain degree by the blast just described, pass downward through the column of fuel in the chamber 20 to the circular space 23 therein, and from thence by the passage 22 into the circular space 24 of the companion chamber 21, where they pass upward through a column of fuel previously charged therein, but not yet ignited, and in so doing impart their sensible heat to said fuel, thereby igniting the same without extracting any of its carbon, except the minimum percentage, which would enter into combination with a small volume of carbonic acid carried by these products of partial combustion, and which reaction would only occur at a high temperature. Rising from this fuel in chamber 21 the gases pass out by its tuyeres 36, recess 38, and passages 41 and 42, and pass out through recess 46 and tuyeres 45 into the heating-chamber 51, where, meeting the blast of air from the opening 44, they are consumed among the refractory material therein, the products of combustion passing downward and escaping by the passage 47 into the boiler-tube 58, and thence into the open air at a very low temperature. When the fuel in the chamber 20 has attained a degree of incandescence ranging from dull white or yellow to bright red, and the fuel in the chamber 21 a degree of incandescence ranging from bright to dull red, the air-blast is shut off, and the passages 41 and 42 are closed by moving the sliding covers 43. The pipe 18 is shifted so as to communicate with the passage 39 of the chamber 20. Steam is then admitted through the pipe 2 (see Figs. 2 and 4) into the passage 39, leading to the top of the chamber 21, and passing downward through the fuel contained therein, which is in a state of low incandescence, is raised to the point of decomposition. The resulting gases then enter the passage 22, and are conveyed to the bottom of the more highly incandescent fuel in the chamber 20, in passing through which the reconversion of the carbonic acid occurs. The finished product then passes upward through the chamber 20 and escapes through the passage 39 and pipe 18 into the hydraulic tank 17, and from thence to the holder or place of use. Any heat contained in the gas may be utilized by conveying the gas through water, which may be subsequently fed to the boiler or applied to any other useful purpose. When the process of gas-making has been continued until the heat of the furnace requires elevating, the steam is shut off from the pipe 2, and the pipe 18 is shifted so as to close the openings of the passages 39. The covers 43 are shifted so as to connect the passages 41 42, and the cover 52 is shifted so as to close the pipe 58, thereby opening the valves 4 and 7. The air-blast from the pipe 55 then passes through the valve 7 and passage 45 into the base of the chamber 51 and through the valve 4 and passage 44 into the top of the chamber 50. The air entering the base of the chamber 51 will pass upward through the now very hot refractory material contained therein, becoming very highly heated, in which condition it will enter the chamber 21 and stimulate a quick combustion in that part of the fuel which by first contact with the steam has become most cooled. Passing downward through this column of fuel, the products of combustion enter the base of the chamber 20, and, passing upward through the fuel in that chamber, pass over by the passages 41 42 into the top of the chamber 50, where, meeting the blast of air from the passage 44, they are consumed among the refractory material in said chamber, the products of combustion escaping through the passage 47 and tube 48 into the open air. When this firing operation, which, it will be observed, is in the reverse direction of the former, has been continued a sufficient length of time to raise the furnace to the proper temperature, the air-blast will be shut off, and, as before, the covers 43 will be shifted so as to close the passages 41 42, and the gas-making will then be resumed, but in a direction the reverse of the former—that is to say, the pipe 18 will be shifted so as to communicate with the passage 39 of the chamber 21, and steam will be admitted through the pipe 1 into the top of the chamber 20, and so the operation may be continued, the firing and gas-making operations being alternately in reverse directions.

Fuel can be supplied to the chambers 20 21 as needed, without interrupting the process or opening the furnace, by means of the hoppers 34, as already set forth.

If it is desired to utilize pulverized, granulated, or fluid forms of fuel, such fuel may be fed either continuously or intermittently to the chambers 20 21 during the firing operation, and a suitable device may be substituted for the hoppers 34 for this purpose. The use of fuels of this character will reduce the quantity of lump fuel required and be found more economical than the proposed use of them in connection with superheated steam by other processes.

If it is desired to carburet the gas produced, it is only necessary to inject into the fuel column, at or a little beyond the point where the decomposition of the steam is effected, petroleum, its residuals, or other fluids or vaporous hydrocarbons, and these, rapidly expanding, mingle with the water-gas, and by contact with it and the highly-incandescent carbon, through which the gases pass together, experience mutual reactions, by which the losses occurring in the mere mechanical effect of a regenerator are to a great extent avoided. The pipes 60, as shown by dotted lines in Fig. 4, indicate a means by which these carbureting substances may be injected into the fuel-chambers.

The different chambers may be connected by any suitable pipes or passages controlled by any suitable valves; but those shown are preferable. Although different in form, they all represent a principle which is found very desirable in practice—their covers or valves being quite free of any lock or fastening and dependent entirely on their own weight, and resting on planed surfaces, over which moving back and forth, they are always by the act kept smooth and tight and yet instantly removable at will. As it is very desirable to have certain movements of different valves made simultaneously and with precision, the arrangement by which this is accomplished is regarded as of great importance, as by this arrangement three single movements are made to control the twelve valves or outlets of the entire furnace. The construction here shown for the bases of the fuel-chambers is also of great importance.

The spaces 23 24 form a continuous annular opening running around the entire inner circumference of the mason-work, into which the gases pass at all points from the fuel, or vice versa, thus reducing the pressure and the liability to form slag. Were the furnace driven from below with air-blast, and especially a superheated blast, the brick edge of this annular space would require protection by means of water-cooling; but, being driven from above, such protection will not generally be required. The alternation of the currents vertically through the columns of fuel drives the ash to the center thereof in the form of a cone, the base resting in the ash-pit, whence the ashes are drawn, as occasion requires, through the space 37 and door 32, the cone settling down quietly and the fuel following in the same manner without undue disturbance to the fire. Any slag that forms does so on the outer surface of the column of fuel next to the annular space, whence it is easily removed through the doors 25 26.

What is claimed is—

1. In a gas-furnace, the combination, with two fuel-chambers 20 21, communicating with each other at their bases, of two air-heating chambers 50 51, communicating with the upper parts of the respective fuel-chambers above the fuel contained therein, and steam-pipes and gas-escape passages also communicating with the upper parts of each of said fuel-chambers above the fuel contained therein, whereby an air-blast may be passed through either of said air-heating chambers, thence downward through the fuel in the fuel-chamber connected therewith and upward through the fuel in the other fuel-chamber, and the products of combustion passed thence through the other air-heating chamber, and whereby steam may be passed downward through the fuel in either fuel-chamber, and then upward through the fuel in the other fuel-chamber, and the resulting gas escape from the upper part of the last chamber, substantially as described.

2. In a gas-furnace, the combination, with two fuel-chambers 20 21, communicating with each other at their bases, of two air-heating chambers 50 51, communicating with the upper parts of the respective fuel-chambers above the fuel contained therein, and steam-pipes and gas-escape passages also communicating with the upper parts of each of said fuel-chambers above the fuel contained therein, whereby an air-blast may be passed through either of said air-heating chambers, thence downward through the fuel in the fuel-chamber connected therewith and upward through the fuel in the other fuel-chamber, and the products of combustion passed thence through the other air-heating chamber, and whereby steam may be passed downward through the fuel in either fuel-chamber and then upward through the fuel in the other fuel-chamber, and the resulting gas escape from the upper part of the last chamber, and the shifting pipe 18, for connecting with the upper parts of the gas-escape passages of either of said fuel-chambers, substantially as described.

3. In a gas-furnace, the combination, with two fuel-chambers 20 21, communicating with each other at their bases, of two air-heating chambers 50 51, communicating with the upper parts of the respective fuel-chambers above the fuel contained therein, and steam-pipes and gas-escape passages also communicating with the upper parts of each of said fuel-chambers above the fuel contained therein, whereby an air-blast may be passed through either of said air-heating chambers, thence downward through the fuel in the fuel-chamber connected therewith and upward through the fuel in the other fuel-chamber, and the products of combustion passed thence through the other air-heating chamber, and whereby steam may be passed downward through the fuel in either fuel-chamber and then upward through the fuel in the other fuel-chamber, and the resulting gas escape from the upper part of the last chamber, and valves for controlling the communication between said air-heating chambers and the respective fuel-chambers, substantially as described.

4. In a gas-furnace, the combination, with two fuel-chambers 20 21, communicating with each other at their bases, of two air-heating chambers 50 51, having connections for receiving an air-blast at each end and communicating with the upper parts of the respective fuel-chambers above the fuel contained therein, and steam-pipes and gas-escape passages also communicating with the upper parts of each of said fuel-chambers above the fuel contained therein, whereby an air-blast may be passed through either of said air-heating chambers, thence downward through the fuel in the fuel-chamber connected therewith, and upward through the fuel in the other fuel-chamber, and the products of combustion passed thence into and burned with an air-blast as they pass through the other air-heating chamber, and whereby steam may be passed downward through the fuel in either fuel-chamber and then upward through the fuel in the other fuel-chamber, and the resulting gas escape from the upper part of the last chamber, substantially as described.

5. In a gas-furnace, the combination, with two fuel-chambers 20 21, communicating with each other at their bases, of two air-heating chambers 50 51, having connections for receiving an air-blast at each end and communicating with the upper parts of the respective fuel-chambers above the fuel contained therein, and steam-pipes and gas-escape passages also communicating with the upper parts of each of said fuel-chambers above the fuel contained therein, whereby an air-blast may be passed through either of said air-heating chambers, thence downward through the fuel in the fuel-chamber connected therewith, and upward through the fuel in the other fuel-chamber, and the products of combustion passed thence into and burned with an air-blast as they pass through the other air-heating chamber, and whereby steam may be passed downward through the fuel in either fuel-chamber and then upward through the fuel in the other fuel-chamber, and the resulting gas escape from the upper part of the last chamber, and a steam-boiler having flues communicating with each of said air-heating chambers to receive the products of combustion therefrom, substantially as described.

6. In a gas-furnace, the combination, with the two fuel or combustion chambers 20 21, of the two air-heating chambers 50 51, the passages 41 42, connecting said fuel and air-heating chambers, the sliding covers 43, for controlling said passages, and means by which said covers can be operated simultaneously, substantially as described.

7. In a gas-furnace, the combination, with the two air-heating chambers 50 51, of the air-pipe 55 and its branches, communicating with the tops and bottom of said chambers, the cocks 4 5 6 7, and means by which said cocks can be operated simultaneously, substantially as described.

In testimony whereof I have hereunto set my hand in the presence of two subscribing witnesses.

MARY T. DWIGHT,
*Administratrix of George S. Dwight, deceased.*

Witnesses:
T. H. PALMER,
J. J. KENNEDY.